United States Patent [19]
Sevik et al.

[11] 3,834,626
[45] Sept. 10, 1974

[54] BELLMOUTH VEHICLE EXHAUST PORT

[75] Inventors: Maurice M. Sevik; Fred E. Smith, both of State College, Pa.

[73] Assignee: The United States of America as represented by the Secretary of the Navy, Washington, D.C.

[22] Filed: Apr. 6, 1970

[21] Appl. No.: 31,052

[52] U.S. Cl. .......................................... 239/265.13
[51] Int. Cl. .......................................... B64d 33/04
[58] Field of Search .............. 239/265.11, 265.13; 60/271; 114/20 R

[56] References Cited
UNITED STATES PATENTS

| | | | |
|---|---|---|---|
| 2,857,119 | 10/1958 | Morguloff | 60/229 |
| 3,069,846 | 12/1962 | Buescher | 239/265.19 |
| 3,286,641 | 11/1966 | Delao et al. | 60/271 |

*Primary Examiner*—Samuel Feinberg
*Attorney, Agent, or Firm*—R. S. Sciascia; Henry Hansen

[57] ABSTRACT

Subject disclosure relates to a unique exhaust nozzle for an underwater vehicle which minimizes the generation and radiation of acoustic energy over a wide band of frequencies. The improved exhaust nozzle structure comprises an external annular lip that extends outwardly at a right angle to the longitudinal axis of the vehicle and forms a cavity downstream from the vehicle into which combustion gases of the vehicle are noiselessly discharged.

2 Claims, 3 Drawing Figures

PATENTED SEP 10 1974　　　3,834,626
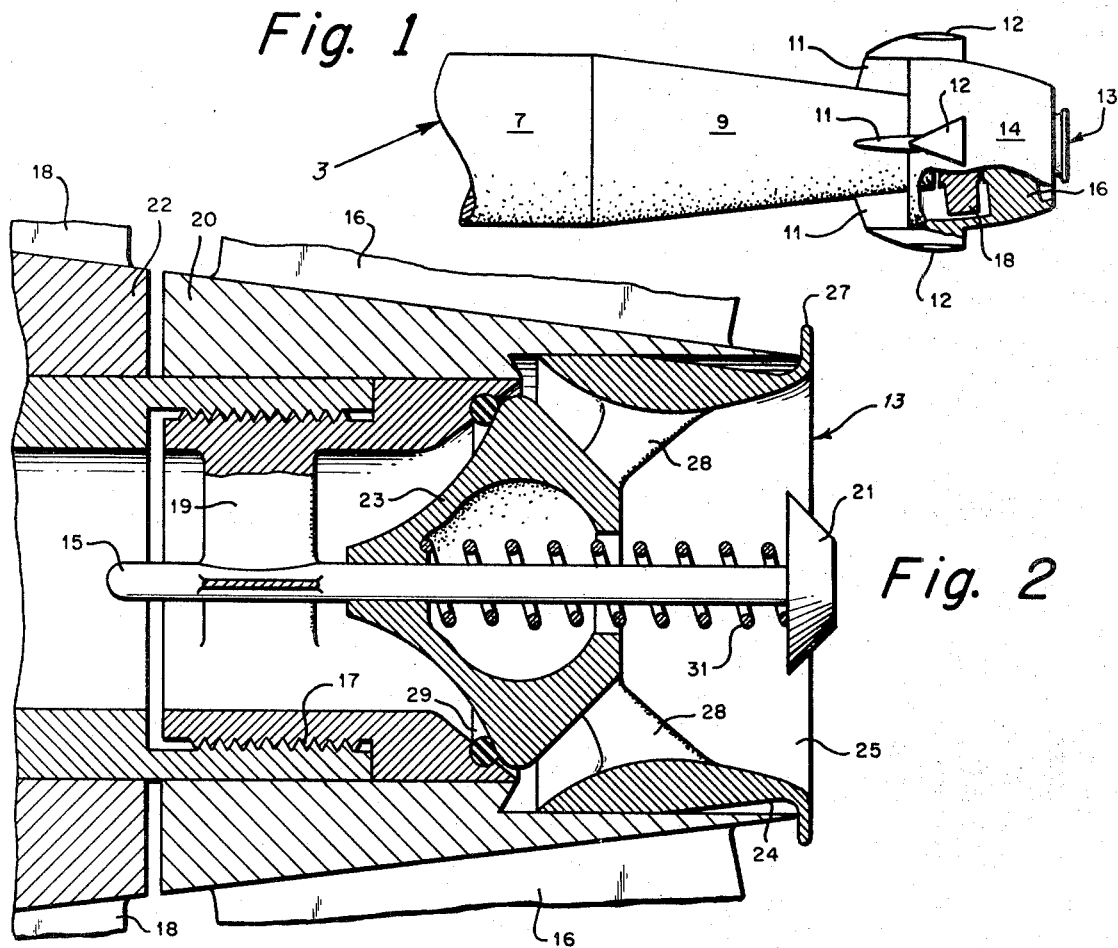
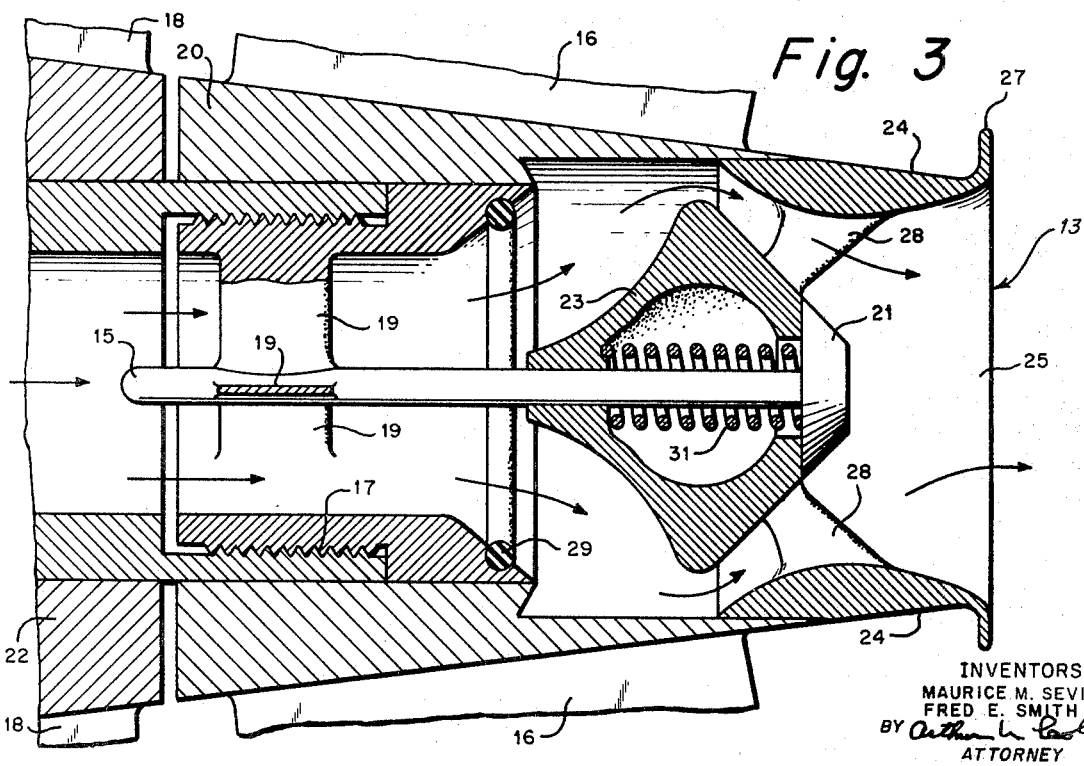
INVENTORS
MAURICE M. SEVIK
FRED E. SMITH
BY Arthur L. Collins
ATTORNEY

BELLMOUTH VEHICLE EXHAUST PORT

In many conventional types of underwater vehicles, the vehicle power plant generates gaseous products of combustion which must be ejected into the surrounding fluid environment. When this process is carried out in an inappropriate manner, the mixing and break-up of the gas in the fluid environment occurs in a relatively violent manner and a substantial radiation of acoustic energy over a wide band of frequencies occurs. Moreover, when the mechanical structure of the exhuast apparatus is inappropriately designed, a spontaneous vibration may occur which leads to the generation of further noise.

It is therefore a principal object of the present invention to provide a novel and improved gas exhaust nozzle for an underwater vehicle which minimizes the generation and radiation of noise as the gaseous products of combustion of the vehicle are discharged into the surrounding fluid environment.

It is a further object of the invention to provide novel and improved exhaust gas nozzle apparatus for an underwater vehicle which develops a cavity downstream from the vehicle into which the discharge gases may be noiselessly dumped.

It is a further object of the invention to provide novel and improved exhaust gas nozzle apparatus for an underwater vehicle which includes an outwardly projecting annular lip that deflects the flow of fluid over the external surface of the vehicle and forms a cavity into which combustion gases of the vehicle are noiselessly discharged.

It is a further object of the invention to provide novel and improved noise reduction exhaust gas nozzle apparatus for an underwater vehicle which does not increase the effective over-all length of the vehicle.

Other objects and many of the attendant advantages of this invention will be readily appreciated as the same become better understood by reference to the following detailed description when considered in connection with the accompanying drawing wherein:

FIG. 1 is a view of an underwater vehicle showing a preferred embodiment of the improved exhaust nozzle apparatus of the present invention;

FIG. 2 is a cross-sectional view of the exhaust nozzle apparatus of the invention shown in FIG. 1 with the nozzle in its closed retracted position;

FIG. 3 is a cross-sectional view of the exhaust nozzle apparatus of the invention shown in FIG. 1 with the nozzle in its open extended position.

Referring now to the various figures of the drawing in more detail, it will be understood that the torpedo-like vehicle 3 consists of three principal sections, the conventional forebody or warhead section (not shown), the center air and fuel storage section 7 and the tapered afterbody-tail section 9. The shroud support vanes 11 on the exterior surface of the tail cone 9 facilitate control of the vehicle 3 through the water. Control surfaces 12 mounted on the vanes 11 provide vertical and horizontal steering.

The improved nozzle assembly 13 of the invention is positioned within the tapered tail section 9 of the vehicle and is slideably movable along the longitudinal axis of the tail section on its support shaft 15. The support shaft is threadedly connected at one end as at 17 to the inner peripheral surface of the tail section 9 through the integrally connected radially projecting strut elements 19. The other end of the support shaft 15 is integrally connected to the truncated-cone shaped terminal element 21 which together with the inner body portion 23 of the assembly forms the inner fairing cone of the nozzle. The bellmouth-shaped outer fairing structural portion 25 of the nozzle assembly is integrally connected to the inner fairing cone structure 23 of the assembly by the radially projecting strut members 28. The outer peripheral surface of the fairing structure 25 is directed outwardly substantially at a right angle to the longitudinal axis of the tail section 9 to form the annular lip 27. The lip 27 extends outwardly beyond the thickness of the boundary layer of fluid flow over the outer peripheral surface of the tail section of the vehicle. A suitable conventional fluid sealing ring 29 is secured in an annular groove in the inner peripheral surface of the tail section 9 of the vehicle. The spring element 31 which is positioned on the nozzle assembly support shaft 15 between its truncated-cone terminal 21 and the inner surface of the inner fairing structure 23 normally biases the nozzle assembly inwardly toward its retracted position on the shaft 15 where the fairing structure 23 engages the sealing ring 29 and prevents seawater or other external foreign matter or fluid from entering the vehicle when the same is not being operated. Although not shown on the drawing, any other suitable conventional mechanism could be used to operate the nozzle assembly between its retracted and extended positions on the shaft 15 without departing from the spirit or scope of the invention.

It should be understood that the preferred embodiment of this invention includes a shroud ring assembly 14 supported on vanes 11. Shroud ring assembly 14 includes stator vanes 16 and stator hub 20. Positioned within shroud ring assembly 14 and connected to the vehicle power plant is the rotor 18 and rotor hub 22. The outer fairing structure 25 includes a generally conical faired surface 24. In order to generate minimum noise radiation from the vehicle, the contour of the external surfaces of the afterbody tail section 9, the rotor hub 22, the stator hub 20, and the surface 24 of fairing structure 25 (in the operable position) should be a smoothly faired generally conical surface.

When the power plant of the vehicle is operated, the nozzle assembly 13 is moved to its extended position on the shaft 15 and the gaseous products of combustion are discharged from the vehicle in a conventional manner. As the vehicle moves through the fluid medium in which it is immersed, the external fluid medium is deflected outwardly by the annular lip 27 of the nozzle assembly and an effective cavity is formed downstream from the vehicle into which the combustion gases of the vehicle are discharged. It has been found that temporary storage of the discharge gases in this cavity allows dissipation of the gases into the surrounding fluid environment in a relatively gentle and noiseless manner. When the power plant of the vehicle is not in operation, the nozzle assembly 13 is moved to its retracted position on the shaft 15 so that the fairing structure 23 engages the sealing ring 29 and prevents the flow of the external fluid medium into the vehicle. Retraction of the nozzle assembly on shaft 15 also reduces the over-all effective length of the vehicle when the same is not in use.

Obviously, many modifications and variations of the present invention are possible in the light of the above teachings. It is therefore to be understood that within the scope of the appended claims, the invention may be practiced otherwise than as specifically described.

What is claimed is:

1. In an underwater vehicle that dishcarges gases and has a flow of water over the outer peripheral surface, apparatus for minimizing the generation and radiation of acoustic energy over a wide band of frequencies, said apparatus comprising:

a bellmouth nozzle thorugh which the discharge gases of the vehicle are exited, the outer peripheral surface of the nozzle being directed outwardly into the flow of water over the outer peripheral surface of the vehicle to form an annular lip, the external water flow over the lip forming a fluid cavity downstream from the vehicle into which gases from the vehicle are noiselessly discharged, said nozzle having an inner fairing cone movable along the axis of flow of discharge gases from the vehicle, between an extended vehicle operable position where the flow of gases from the vehicle is substantially unobstructed and a retracted vehicle non-operative position where the nozzle is closed.

2. An apparatus according to claim 1, wherein said nozzle further comprises:

said lip on the outer peripheral surface of the nozzle extending outwardly at a right angle to the longitudinal axis of the vehicle beyond the thickness of the boundary layer of fluid flow over the outer peripheral surface of the vehicle.

* * * * *